(12) United States Patent
Lin

(10) Patent No.: US 7,488,225 B2
(45) Date of Patent: Feb. 10, 2009

(54) PROPELLER FOR BOAT

(76) Inventor: Yeun-Junn Lin, 5F, No. 21, Lane 10, Tian Bao Street, Taichung (TW)

( * ) Notice: Subject to any disclaimer, the term of this patent is extended or adjusted under 35 U.S.C. 154(b) by 0 days.

(21) Appl. No.: 11/710,447

(22) Filed: Feb. 26, 2007

(65) Prior Publication Data

US 2008/0096446 A1    Apr. 24, 2008

(30) Foreign Application Priority Data

Oct. 23, 2006    (TW) ............................... 95218717 U

(51) Int. Cl.
 *B63H 1/15* (2006.01)
 *B63H 1/06* (2006.01)
 *F16D 3/00* (2006.01)
 *B63H 23/34* (2006.01)

(52) U.S. Cl. ........................ 440/52; 440/83; 416/135; 464/89

(58) Field of Classification Search .................. 440/52
See application file for complete search history.

(56) References Cited

U.S. PATENT DOCUMENTS

| | | | | |
|---|---|---|---|---|
| 4,452,591 A | * | 6/1984 | Fishbaugh et al. | ............ 464/89 |
| 4,566,855 A | * | 1/1986 | Costabile et al. | ........ 416/134 R |
| 5,252,028 A | * | 10/1993 | LoBosco et al. | .......... 416/93 A |

* cited by examiner

*Primary Examiner*—Jesus D Sotelo
(74) *Attorney, Agent, or Firm*—Browdy and Neimark, P.L.L.C.

(57) ABSTRACT

A propeller for a boat includes a propeller shaft having a shaft hole, a shaft sleeve mounted in the shaft hole of the propeller shaft and provided with a metal core with a through hole for insertion of a driving shaft of the boat, and a shock-absorbing member covering an outer surface of the metal and having an outer surface contacted with an inner surface of the propeller shaft that surrounds the shaft hole; and a lock unit mounted on the driving shaft for fixing the driving shaft in the through hole of the shaft sleeve, so that the propeller is rotatable by the driving shaft. When the propeller bumps hard things during rotation to result in vibration to the propeller, the shock-absorbing member can absorb the vibration so as to protect the driving shaft from damage.

5 Claims, 6 Drawing Sheets

PROPELLER FOR BOAT

BACKGROUND OF THE INVENTION

1. Field of the Invention

The present invention relates to a propeller for use in a boat and more specifically, to a propeller that has shock-absorbing effect and can bear relatively higher torsion.

2. Description of the Related Art

FIG. 7 shows a conventional propeller 80 for use in a boat according to a prior art. The propeller 80 comprises a propeller shaft 81 inside which a shaft sleeve 82 is firmly installed. An adapter 83 is disposed inside the shaft sleeve 82. A driving shaft 84 of the boat passes through the adapter 83 and is fastened to the adapter 83 by a tab washer 85 and a lock nut 86. Accordingly, the adapter 83 and the shaft sleeve 82 can be driven to rotate by an engine of the boat through the driving shaft 84, resulting in a synchronous rotation of the propeller shaft 81.

According to this design, the shaft sleeve 82 is made of rigid materials. If the propeller 80 bumps hard things during rotation, the shaft sleeve 82 may be broken, or even that the driving shaft 84 of the engine may be damaged. Besides, if the driving shaft 84 outputs an exceeding torsion or receives an extreme impact suddenly, the shaft sleeve 82 may be also broken because the shaft sleeve 82 is driven by the adapter 83, which is driven by the driving shaft 84. If the shaft sleeve 82 is broken, the adapter 83 cannot run well. Thus, the conventional design of the propeller 80 is unable to be connected to a high-powered engine due to this potential defect. In addition, the adapter 83 and the shaft sleeve 82 must be coaxially aligned with the driving shaft 84 when they are assembled. However, because the adapter 83 and the shaft sleeve 82 are independently produced, any size inaccuracy in production of the adapter 83 or the shaft sleeve 82 will cause a possible clearance of assembly among the shaft sleeve 82, the adapter 83 and the driving shaft 84, resulting in a working vibration when the shaft sleeve 82 and the adapter 83 are driven to rotate by the driving shaft 84 in high speed.

SUMMARY OF THE INVENTION

The present invention has been accomplished under the circumstances in view. It is therefore one objective of the present invention to provide a propeller for a boat, which provides a shock-absorbing effect for protecting an engine of the boat from damage.

It is another objective of the present invention to provide a propeller for a boat, which can bear a relatively higher torsion and generate less vibration when rotating.

It is still another objective of the present invention to provide a propeller for a boat, which is easy to manufacture.

To achieve these objectives of the present invention, the propeller for a boat comprises a propeller shaft, a shaft sleeve and a lock unit. The shaft sleeve is mounted in a shaft hole of the propeller shaft and provided with a metal core with a through hole for insertion of a driving shaft of the boat, and a shock-absorbing member covering an outer surface of the metal core and having an outer surface contacted with the inner surface of the propeller shaft that surrounds the shaft hole. The lock unit is mounted on the driving shaft for fixing the driving shaft in the through hole, so that the propeller is rotatable by the driving shaft. Therefore, when the propeller of the present invention bumps hard things during rotation to result in vibration to the propeller, the shock-absorbing member can absorb the vibration to protect the driving shaft and a gearbox of an engine of the boat connected with the driving shaft from damage.

In a preferred embodiment of the present invention, the metal core has a plurality of ribs extending from a center portion thereof for transmission of the output torsion of the driving shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
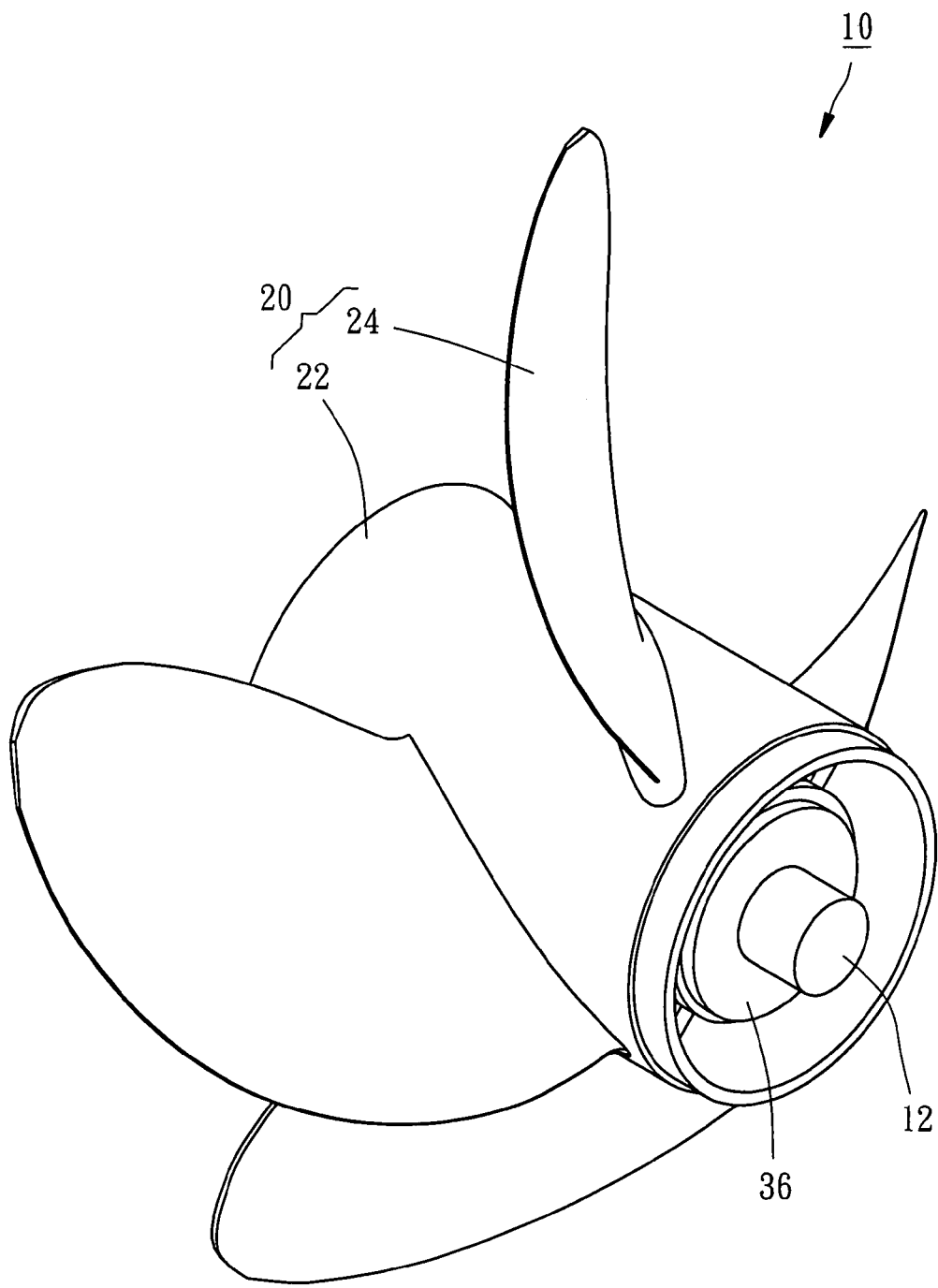
FIG. 1 is a perspective view of a preferred embodiment of the present invention.
Figure 2:
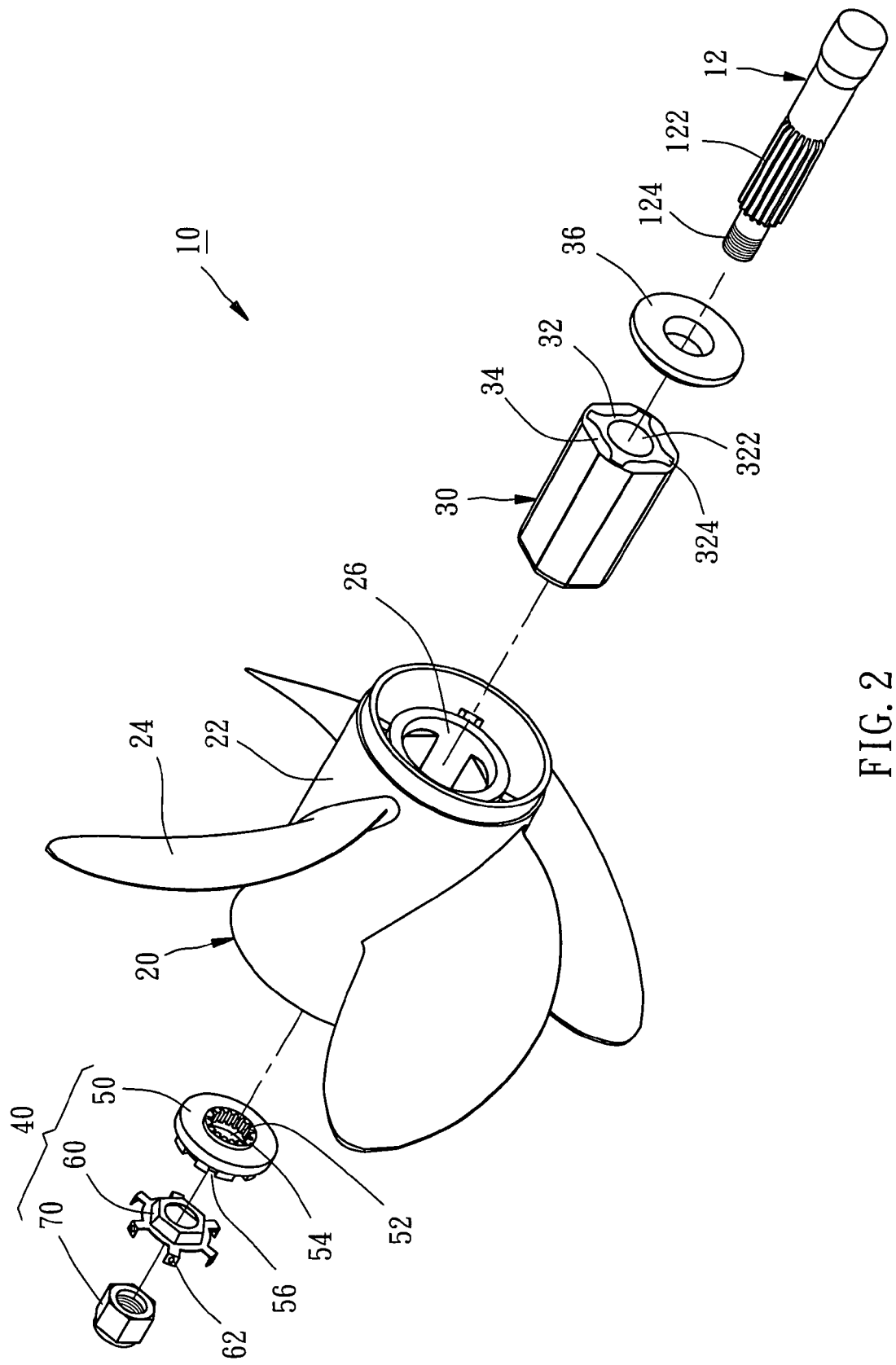
FIG. 2 is an exploded view of the preferred embodiment of the present invention.
Figure 3:
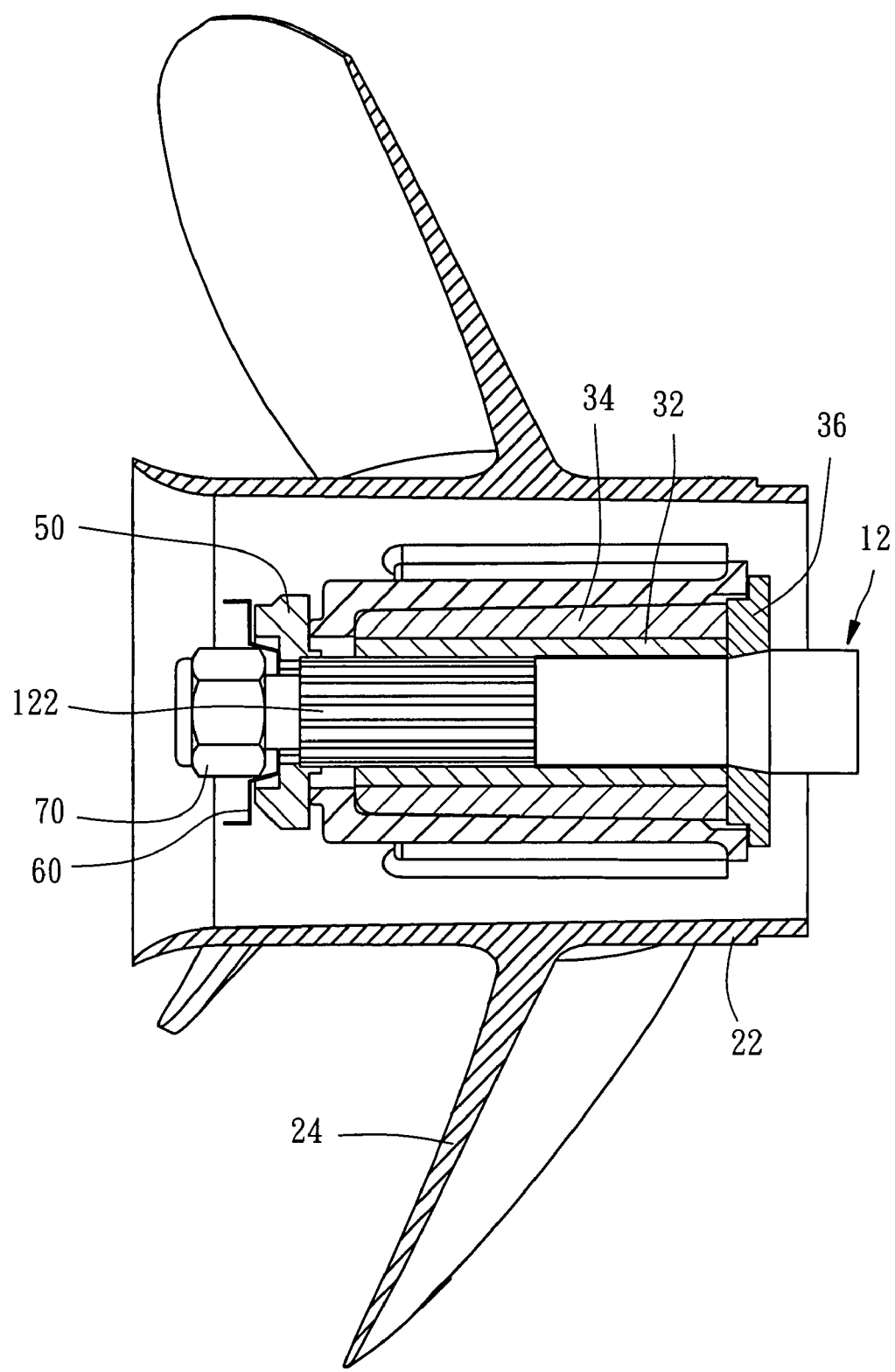
FIG. 3 is a sectional assembly view of the preferred embodiment of the present invention.

As shown in FIG. 1 to FIG. 3, a propeller 10 for a boat in accordance with a preferred embodiment of the present invention comprises a propeller shaft 20, a shaft sleeve 30, and a lock unit 40. The boat comprises an engine (not shown), a gearbox (not shown), and a driving shaft 12 connected with the engine through the gearbox and rotatable by the engine. The driving shaft 12 is provided with a teeth portion 122 at the middle part thereof and a thread portion 124 at the rear part thereof.

The propeller shaft 20 is provided with a hub 22 and a plurality of propeller blades 24, which extend equiangularly outwardly and curvedly from the hub 22. The hub 22 is provided with a shaft hole 26 through the front side and the back side thereof.

Figure 4:
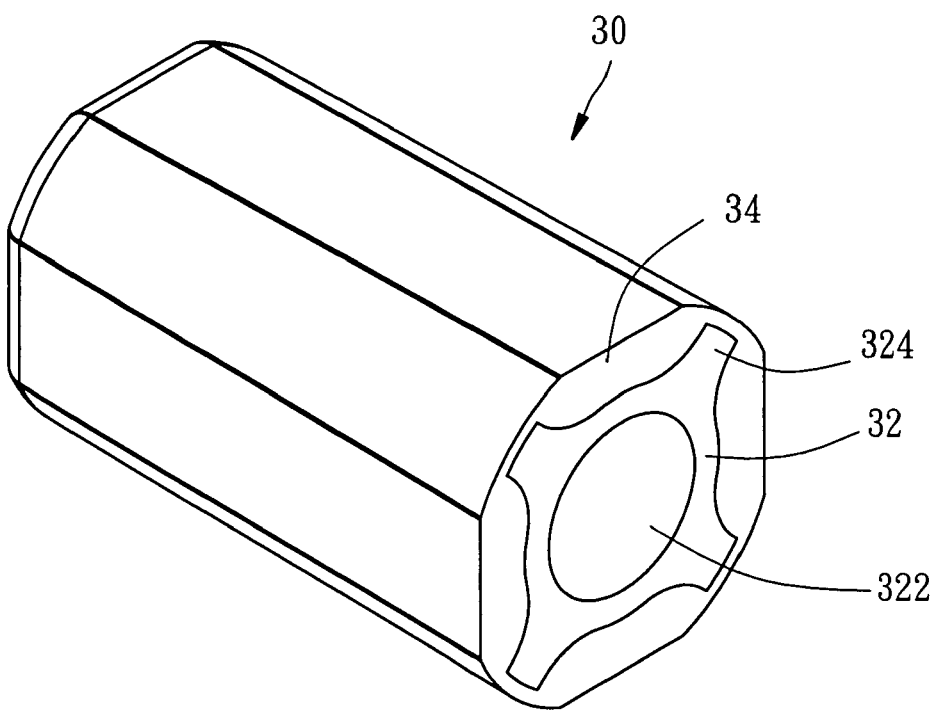
FIG. 4 is a perspective view of a shaft sleeve of the preferred embodiment of the present invention.
Figure 5:
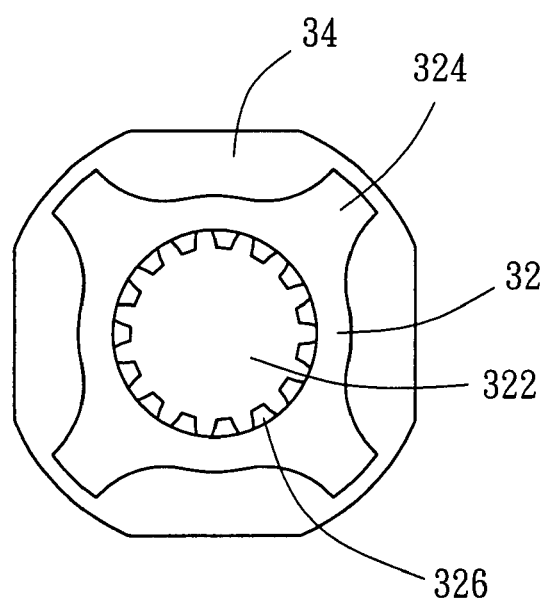
FIG. 5 is an end view of the shaft sleeve of the preferred embodiment of the present invention.
Figure 6:
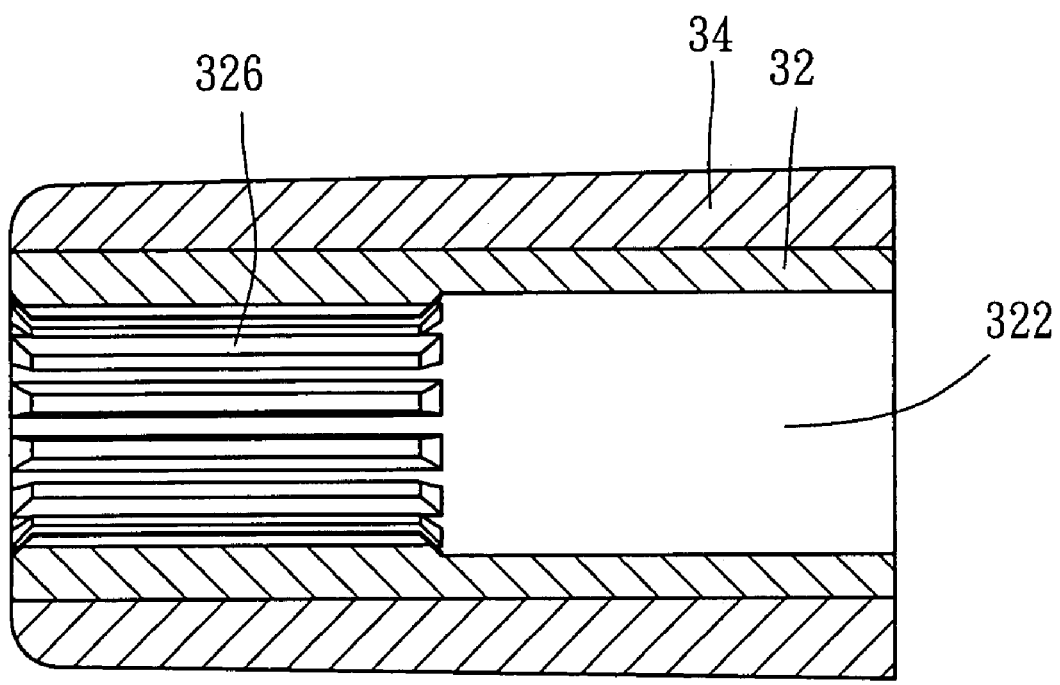
FIG. 6 is a sectional view of the shaft sleeve of the preferred embodiment of the present invention.
Figure 7:
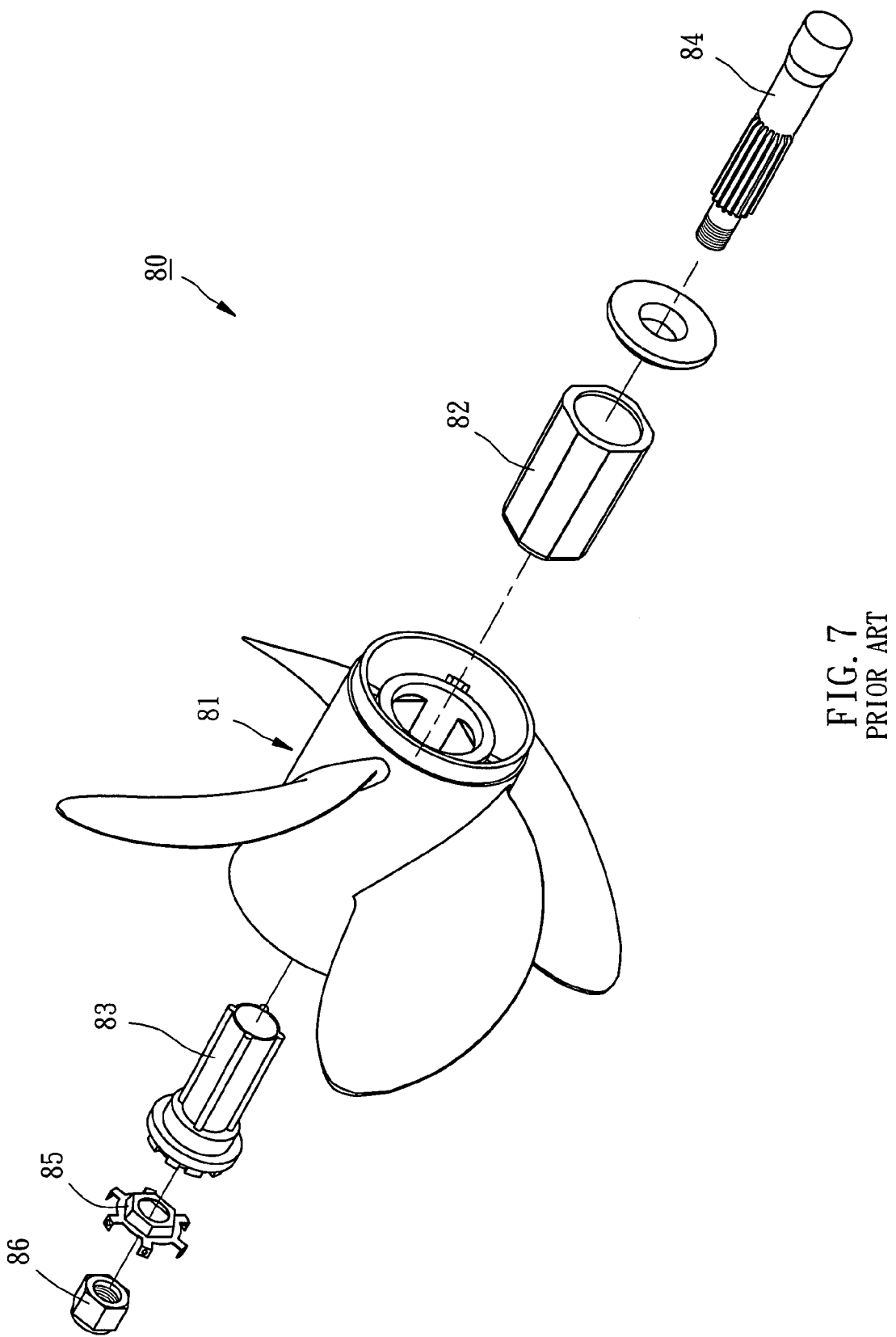
FIG. 7 is an exploded view of a propeller of the prior art.

As shown in FIG. 4 and FIG. 5, the shaft sleeve 30 is provided with a metal core 32 with a center through hole 322 for the insertion of the driving shaft 12, and a shock-absorbing member 34 covering an outer surface of the metal core 32. A thrust washer 36 is sleeved onto the driving shaft 12 and attached to the front end of the shaft sleeve 30. If the propeller 10 is going to be connected with a driving shaft having relatively higher output torsion, the metal core 32 is preferably made of stainless steel. If the propeller 10 is going to be connected with a driving shaft having relatively smaller output torsion, the metal core 32 can be made of aluminum alloy. The metal core 32 has four ribs 324 equiangularly spaced around a center portion thereof and extending along the longitudinal axis of the metal core from the front end to the rear end thereof. As shown in FIG. 6, the center through hole 322 of the metal core 32 is provided with a transmission teeth portion 326 at the rear part thereof, which is designed to be engaged with the teeth portion 122 of the driving shaft 12. The shock-absorbing member 34 is preferably made of rubber. The shaft sleeve 30 as shown in the figures is formed in a unit by metal core 32 covered by shock-absorbing member 34 and then is mounted in the shaft hole 26 of the propeller shaft 20 to make the outer surface of the shock-absorbing member 34 to be firmly contacted with the inner surface that surrounds the shaft hole 26. The driving shaft 12 is inserted into the through hole 322 and pushes the thrust washer 36 to firmly attach on the front end of the shaft sleeve 30.

The lock unit 40 comprises an adapter 50, a tab washer 60 and a lock nut 70. The adapter 50 is provided with an adapter hole 52 with a teeth portion 54 for engagement with the teeth portion 122 of the driving shaft 12, and a plurality of lock sockets 56 at rear end surface of the adapter 50. The tab washer 60 is mounted onto the driving shaft 12 and coupled with the adapter 50. The tab washer 60 has a plurality of tabs 62, each of which can be bent to embed in each lock socket 56 for fixing the tab washer 60 to the adapter 50, such that the tab washer 60 can be synchronously rotated with the adapter 50. The lock nut 70 is fastened to the thread portion 124 of the driving shaft 12 and firmly stopped against the tab washer 60 for fixing the driving shaft 12 in the through hole 322, so that the propeller 10 can be driven to rotate by the driving shaft 12.

When the propeller 10 bumps hard things during rotation to result in vibration to the propeller 10, the shock-absorbing member 34 that covers the metal core 32 can absorb the vibration so as to avoid the metal core 32 from breaking, such that the driving shaft 12 inserted in the shaft sleeve 30 and the gearbox connected with the driving shaft 12 can be further protected from damage. In addition, if the driving shaft 12 inserted in the shaft sleeve 30 has relatively higher output torsion, the torsion can be borne by the shaft sleeve 30 through the ribs 324, which is covered with the shock-absorbing member 34. Therefore, the propeller 10 of the present invention can be connected to a high-powered engine. Moreover, as long as the through hole 322 is coaxially processed with the driving shaft 12, an assembly clearance between the through hole 322 and the driving shaft 12 can be decreased to the lowest level, thereby eliminating the possible vibration in high-speed rotation generated due to the assembly clearance.

Consequently, the propeller of the present invention is easy to manufacture and provides a shock-absorbing effect for protecting the gearbox and/or the driving shaft of the boat from damage. The propeller of the present invention can bear relatively higher torsion and therefore can be connected to a high-powered engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A propeller for a boat having a driving shaft, the propeller comprising:
   a propeller shaft having a shaft hole surrounded by an inner surface of the propeller shaft;
   a shaft sleeve mounted in the shaft hole having a metal core with a through hole for insertion of the driving shaft, and a rubber shock-absorbing member formed as a unit with the metal core by encasing an outer surface of the metal core,
   wherein an outer surface of the shaft sleeve abuttingly engages the inner surface of the propeller shaft;
   wherein the metal core has only four ribs having concave sides and are equiangularly spaced around a center portion thereof and extend along a longitudinal axis of the metal core, and
   a lock unit mounted on the driving shaft for fixing the driving shaft in the through hole of the shaft sleeve, so that the propeller is rotatable by the driving shaft.

2. The propeller as claimed in claim 1, wherein the locking unit comprises an adapter coupled with the shaft sleeve and engaged with the driving shaft, a tab washer mounted on the driving shaft and coupled with the adapter, and a lock nut engaged with the driving shaft and stopped against the tab washer.

3. The propeller as claimed in claim 1, further comprising a thrust washer sleeved onto the driving shaft and attached to the shaft sleeve.

4. The propeller as claimed in claim 1, wherein the metal core is made of stainless steel.

5. The propeller as claimed in claim 1, wherein the metal core is made of aluminum alloy.

\* \* \* \* \*